(12) United States Patent
Yu et al.

(10) Patent No.: US 9,896,793 B2
(45) Date of Patent: Feb. 20, 2018

(54) STABILIZER AND LAUNDRY PROCESSING DEVICE INCLUDING SAME

(71) Applicant: LG ELECTRONICS INC., Seoul (KR)

(72) Inventors: Insik Yu, Seoul (KR); Youngjong Kim, Seoul (KR); Youngjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/386,618

(22) Filed: Dec. 21, 2016

(65) Prior Publication Data

US 2017/0183802 A1    Jun. 29, 2017

(30) Foreign Application Priority Data

Dec. 24, 2015 (KR) .................. 10-2015-0186399

(51) Int. Cl.
| | |
|---|---|
| *D06F 37/24* | (2006.01) |
| *D06F 37/20* | (2006.01) |
| *D06F 37/26* | (2006.01) |
| *F16F 15/04* | (2006.01) |
| *D06F 37/22* | (2006.01) |

(52) U.S. Cl.
CPC .............. *D06F 37/24* (2013.01); *D06F 37/20* (2013.01); *D06F 37/268* (2013.01); *F16F 15/04* (2013.01); *D06F 37/22* (2013.01)

(58) Field of Classification Search
CPC .......... D06F 37/20; D06F 37/22; D06F 37/24; D06F 37/268; F16F 15/04

USPC ........................................... 68/23.3
See application file for complete search history.

(56) References Cited

U.S. PATENT DOCUMENTS

| | | | | |
|---|---|---|---|---|
| 3,021,956 A | * | 2/1962 | Bochan ................... | D06F 37/24 210/364 |
| 4,625,529 A | * | 12/1986 | Anderson ............... | D06F 37/24 248/612 |
| 6,286,344 B1 | * | 9/2001 | Jeon ....................... | D06F 23/06 68/173 |

(Continued)

FOREIGN PATENT DOCUMENTS

| | | |
|---|---|---|
| JP | 2001-212395 | 8/2001 |
| JP | 2015-223283 | 12/2015 |

(Continued)

OTHER PUBLICATIONS

Machine translation of KR 20-1998-0011453 U, no date.*

(Continued)

*Primary Examiner* — Joseph L Perrin
(74) *Attorney, Agent, or Firm* — KED & Associates, LLP

(57) ABSTRACT

A stabilizer according to an embodiment of the present invention includes one or plurality of fixing members which are mounted on an outer circumferential surface of a tub which is upright so that an opening portion for inputting laundry faces an upper surface of a laundry processing device, a connecting member which is connected to the fixing member and is elastically deformed by force in a horizontal direction which allows the tub to be vibrated in the horizontal direction, and a damping member which absorbs or offsets the force in the horizontal direction by being connected to the connecting member.

15 Claims, 8 Drawing Sheets

(56) References Cited

U.S. PATENT DOCUMENTS

| | | | | |
|---|---|---|---|---|
| 2011/0167878 A1* | 7/2011 | De Angelo Sanchez | ............... | D06F 37/268 68/212 |
| 2012/0056517 A1* | 3/2012 | Noh | ....................... | D06F 37/24 312/228 |
| 2014/0060120 A1* | 3/2014 | Yu | .......................... | D06F 37/24 68/132 |
| 2016/0369444 A1* | 12/2016 | Kim | ....................... | D06F 37/24 |
| 2017/0183802 A1* | 6/2017 | Yu | .......................... | F16F 15/04 |

FOREIGN PATENT DOCUMENTS

| | | | | |
|---|---|---|---|---|
| KR | 20-1990-0012267 | * | 7/1990 | ............ D06F 37/24 |
| KR | 20-1998-0011453 | | 5/1998 | |
| KR | 10-0685977 | | 2/2007 | |
| KR | 10-2012-0029853 | | 3/2012 | |
| KR | 10-1217118 | | 12/2012 | |
| KR | 10-2015-0011221 | | 1/2015 | |

OTHER PUBLICATIONS

International Search Report and Written Opinion dated Mar. 9, 2017 filed Application No. PCT/KR2016/013665 (Full English Text).
Korean Office Action dated Feb. 18, 2016 issued in Application No. 10-2015-0186399 (with English translation).
Korean Final Office Action dated Jun. 28, 2016 issued in Application No. 10-2015-0186399 (with English translation).
Korean Notice of Allowance dated Aug. 29, 2016 issued in Application No. 10-2015-0186399 (with English translation).

* cited by examiner

STABILIZER AND LAUNDRY PROCESSING DEVICE INCLUDING SAME

CROSS-REFERENCE TO RELATED PATENT APLLICATIONS

This application claims priority under 35 U.S.C. § 119 to Korean Application No. 10-2015-0186399 filed on Dec. 24, 2015.

BACKGROUND

The present invention relates to a stabilizer which damps horizontal vibration of an outer tub and a laundry processing device including the same.

A laundry processing device, as a device that removes dirt which accumulates in laundry by applying physical and chemical action to the laundry, may includes a washing tub (or inner tub) in which the laundry is input, a pulsator which is rotatably mounted at the center of the bottom of the washing tub, a tub (or outer tub) in which the washing tub is accommodated and which is filled with washing water, and a cabinet which wraps and protects the tub and forms an outer appearance of the laundry processing device.

The tub is connected to the cabinet by a support rod and a suspension and the vibration acting on the tub during the washing process is absorbed by the suspension.

Various types of horizontal vibration damping structure are proposed in order to damp the vibration in the horizontal direction. As an example, a vibration prevention member is disclosed which prevents hit between the tub and cabinet due to the vibration in the horizontal direction in Korean Registered Patent No. 10-1217118 (Dec. 24, 2012).

SUMMARY

However, the laundry processing device which includes the vibration prevention member disclosed in the related art has following problems.

First, since a body which constitutes the vibration prevention member disclosed in the related art has the form of a solid bar, the vibration in the horizontal direction acting on the tub is not absorbed by the vibration prevention member and thus is transferred to a suspension unit as it is. The vibration prevention member is capable of rotating about the suspension unit by a moment being generated in the body of the vibration prevention member by the vibration in the horizontal direction.

However, the force which acts in a direction perpendicular to the rod-shaped damper which constitutes the suspension unit can not be essentially blocked from being transferred to the damper. Accordingly, there is a disadvantage of being capable of generating a phenomenon that the suspension unit is bent or broken by the vibration in the horizontal direction acting in a direction intersecting with the suspension unit.

Second, since the vibration in the horizontal direction acting on the tub is not absorbed by the vibration prevention member and thus is transferred to the suspension unit, a phenomenon that a connecting portion between the tub and the vibration prevention member and a connecting portion between the suspension unit and the vibration prevention member are broken is can be generated.

The present invention is proposed to improve the problems described above.

A stabilizer according to an embodiment of the present invention for achieving the above objective includes one or plurality of fixing members which are mounted on an outer circumferential surface of a tub which is upright so that an opening portion for inputting laundry faces an upper surface of a laundry processing device, a connecting member which is connected to the fixing member and is elastically deformed by force in a horizontal direction which allows the tub to be vibrated in the horizontal direction, and a damping member which absorbs or offsets the force in the horizontal direction by being connected to the connecting member. The connecting member includes a cover portion which is connected to the one or plurality fixing members by being rounded along the outer circumferential surface of the tub, and a bent portion which is bent at both ends of the cover portion and then extends. The damping member includes a damping portion through which the bent portion passes, and a connecting portion which is coupled to the damping portion. The connecting portion is connected to a supporting rod which connects the tub and a cabinet accommodating the tub with each other. In a case where the force in the horizontal direction is transferred to the connecting member, a friction force which offsets the force in the horizontal force between the bent portion and the damping portion by the bent portion relatively moving in the horizontal direction with respect to the damping portion.

By the stabilizer and the laundry processing apparatus including the same according to the embodiment of the present invention having the above-described structure, the following effects can be obtained.

First, there is an advantage of be capable of minimizing possibility of breakage of the support rod supporting the tub by providing the damping member which absorbs and damps the vibration in the horizontal direction acting on the tub to the stabilizer.

Second, the vibration in the horizontal direction can be absorbed by the damping member primarily and can be damped by the elastic deformation of the connecting member secondarily, by the stabilizer according to the embodiment of the present invention.

Third, there is an advantage of the vibration absorption ability being improved since the vibration in the horizontal direction acting on the tub is distributed and is transferred to the two supporting rods through the stabilizer, by a supporting rod which supports the tub on both end portions of the stabilizer according to the embodiment of the present invention.

DETAILED DESCRIPTION OF THE EMBODIMENTS

Hereinafter, a stabilizer and a laundry processing device including a stabilizer according to the embodiment of the present invention will be described in detail with reference to the drawings.

Figure 1:
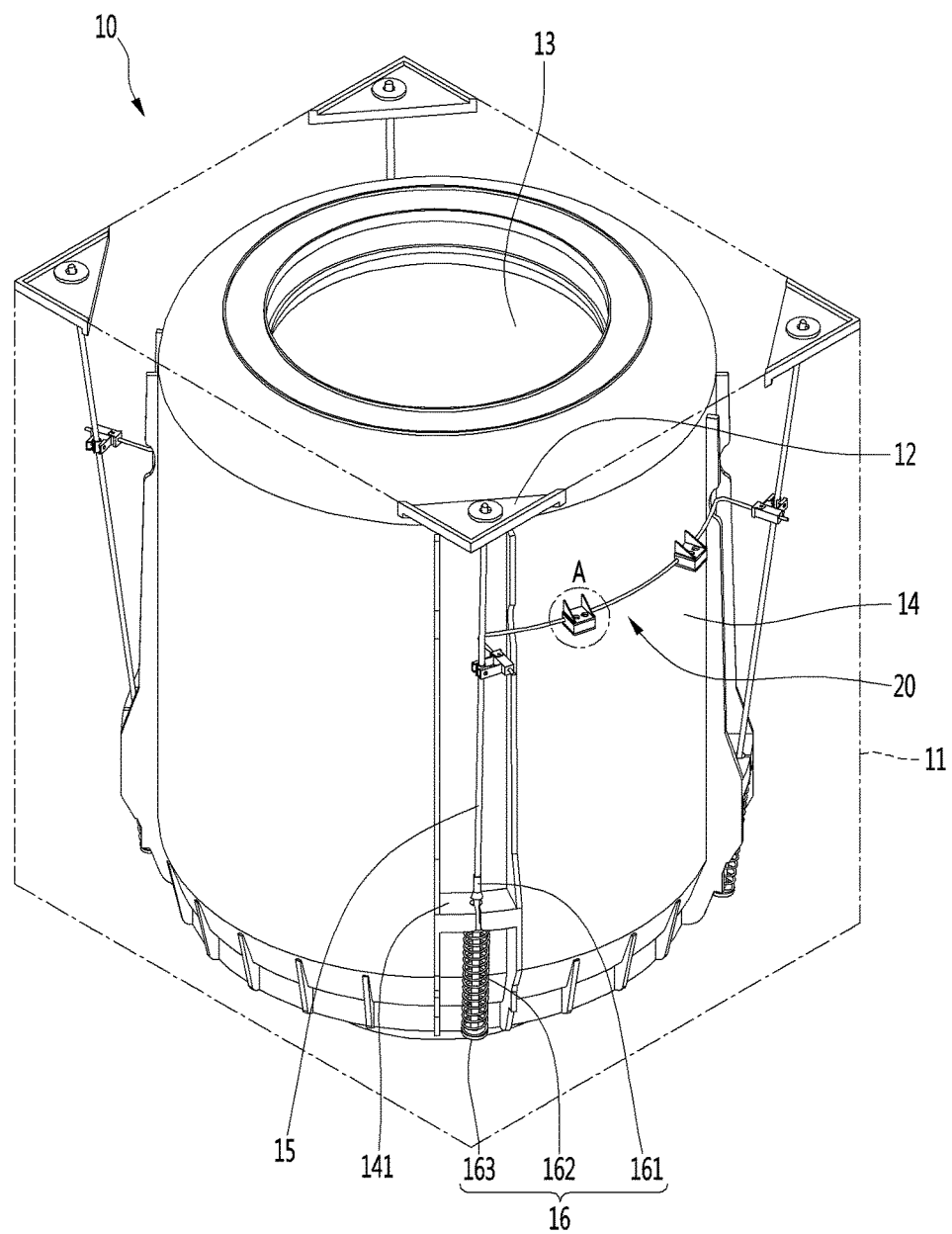
FIG. 1 is a perspective view illustrating an internal construction of a laundry processing device on which a stabilizer is mounted according to an embodiment of the present invention.

FIG. 1 is a perspective view illustrating an internal construction of a laundry processing device on which a stabilizer is mounted according to an embodiment of the present invention.

With reference to FIG. 1, a laundry processing device 10 according to an embodiment of the present invention may include a cabinet 11 which forms an outer appearance of the laundry processing device, a tub 14 which is accommodated in an inside portion of the cabinet 11, a washing tub 13 which is rotatably installed in an inside portion of the tub 14, a pulsator (not illustrated) which is rotatably mounted on a center of a bottom portion of the washing tub 13, a supporting means which supports the tub 40 by the cabinet 11, and a stabilizer 20 which absorbs and damps vibration in a horizontal direction acting on the tub 14.

Specifically, the supporting means includes a supporting rod 15 of which one end is connected to the cabinet 11, and a suspension 16 which is connected to the other end of the supporting rod 15 and which is mounted on an outer circumferential surface of the tub 15.

The supporting portion 12 is formed on four corners of an upper end portion of the cabinet 11 and the cabinet 11 supports load of the tub 14 by one end of the supporting rod 15 being connected to the supporting portion 12.

In addition, the suspension 16 may include an air cap which is inserted into the other end of the supporting rod 15 and in which a shock absorbing member is provided, an elastic member 162 which is inserted from a low side of the air cap 161 into an outer circumferential surface of the supporting rod 15, and a base 163 which is connected to the other end of the supporting rod 15. A suspension hooking portion 14 is formed on a lower end of the outer circumferential surface of the tub 14 and the other end of the supporting rod 15 in which the suspension 16 is provided is connected to the suspension hooking portion 14. The load of the tub 14 and vibration in a vertical direction acting on the tub is absorbed and is damped in the suspension 16.

The structure and the function of the suspension 16 is not described in more detail, since the structure and the function of the suspension 16 is described in detail in the Korean Patent Laid-Open No. 10-2012-0029853 which is filed by an applicant of the present invention.

Meanwhile, the stabilizer 20 is mounted on the outer circumferential surface of the tub 14 and both ends of the stabilizer 20 are connected to the supporting rod 15. Accordingly, the vibration in the horizontal direction acting on the tub 14 is transferred to the supporting rod 15 through the stabilizer 20. Most of the vibration in the horizontal direction is absorbed in the stabilizer 20.

In addition, the supporting rod 15 is disposed on right and left corners of a front surface portion and right and left corners of a rear surface of the cabinet. The two stabilizers 20 may be disposed on a front surface portion and a rear surface portion of the tub 14, respectively or on a left side and a right side of the tub 14, respectively.

However, the disposition structure of the stabilizer 20 is not limited to this, and the stabilizer 20 may be mounted on only any one side surface of the front, rear, right and left side surfaces of the tub 14 or may be mounted on all the four side surfaces.

Hereinafter, a structure and a function of a stabilizer according to the embodiment of the present invention will be described in detail with reference to the drawings.

Figure 2:
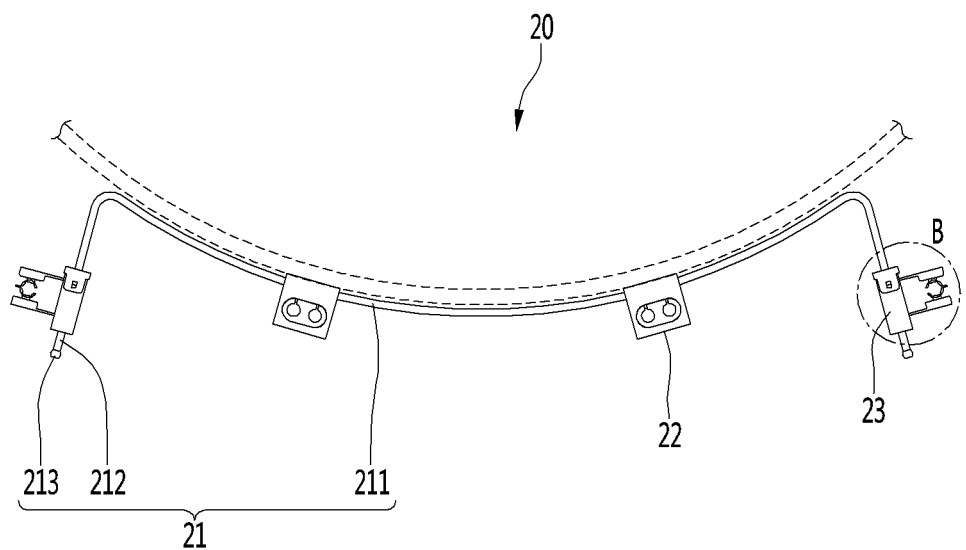
FIG. 2 is a perspective view illustrating the stabilizer according to the embodiment of the present invention.

FIG. 2 is a perspective view illustrating the stabilizer according to the embodiment of the present invention.

With reference to FIG. 2, the stabilizer 20 according to the embodiment of the present invention may includes a connecting member 21, a fixing member 22 which is fixed the connecting member 21 to the outer circumferential surface of the tub 21, and a damping member 23 which is mounted on both end portions of the connecting member 21.

Specifically, although the connecting member 21 has a rod shape including a metal wire as illustrated, it is not necessarily limited to this. The connecting member 21 may include a cover portion 211 which is rounded in a predetermined curvature in a shape wrapping the outer circumferential surface of the tub 14, a bent portion 212 which is bent at both ends of the cover portion 211 and then extends, and a hooking portion 213 which is formed on the end portion of the bent portion 213.

One or a plurality of fixing members 22 are connected to the cover portion 211. A curvature of the cover portion 211 may be formed to be equal to a curvature of cross-sectional surface of the tub 14 or to be less than the curvature of cross-sectional surface of the tub 14.

The bent portion 212 is formed by a portion of the cover portion 211 being bent and extends in a direction away from the outer circumferential surface of the tub 14. A bent angle θ between the bent portion 212 and the cover portion 211 may be determined between 45 degrees and 135 degrees. More preferably, the bent angle θ may be determined between 60 degrees and 120 degrees, or between 80 degrees and 100 degrees.

The bent portion 212 passes through the damping member 23. In other words, the damping member 23 damps the vibration in the horizontal direction while slidably moving in a longitudinal direction of the bent portion 212 along the bent portion 212 by the vibration in the horizontal direction acting on the tub 14.

In addition, the damping portion 23 is prevented from being separated from the bent portion 212 by the hooking portion 213 being formed in the end portion of the bent portion 212.

Figure 3:
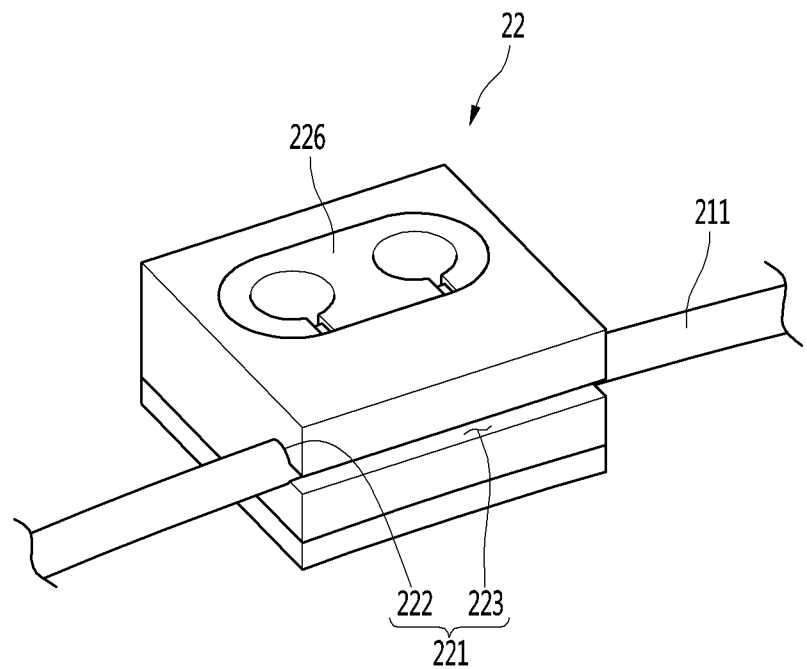
FIG. 3 is a perspective view illustrating a fixing member constituting the stabilizer according to the embodiment of the present invention.
Figure 4:
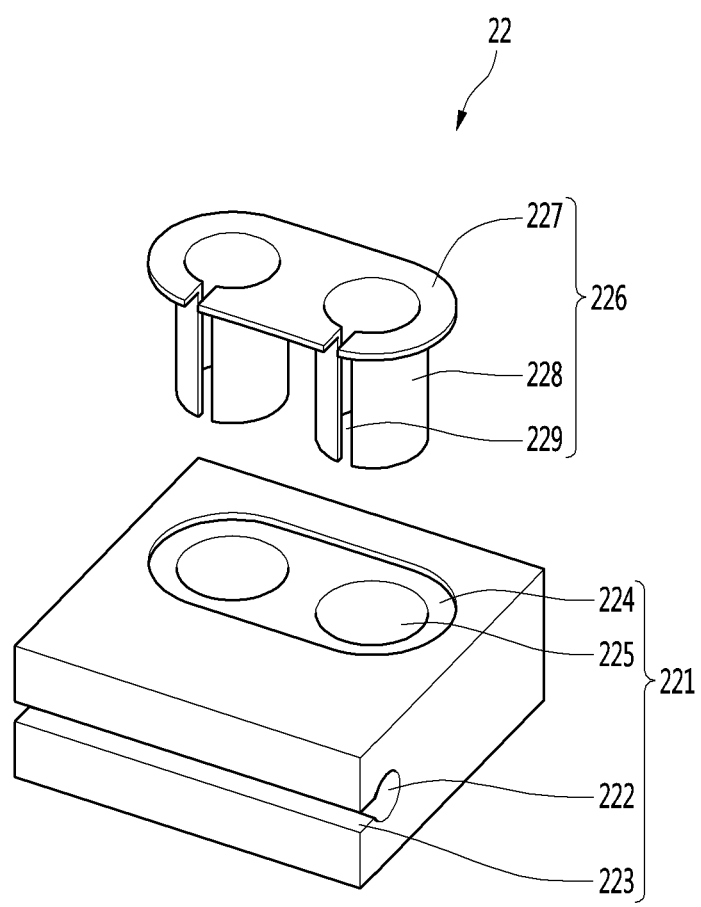
FIG. 4 is an exploded perspective view illustrating the fixing member.

FIG. 3 is a perspective view illustrating a fixing member constituting the stabilizer according to the embodiment of the present invention, and FIG. 4 is an exploded perspective view illustrating the fixing member.

With reference to FIG. 3 and FIG. 4, the fixing member 22 constituting the stabilizer 20 according to the embodiment of the present invention includes a fixing block 221, and a pin supporting member 226 which is inserted into the fixing block 221.

Specifically, although the fixing block 221 may be made of elastically deformable rubber or silicon material and may be a flat hexahedral shape, the shape of the fixing block 221 is not limited to this. A slit 223 is formed on a rear surface of the fixing block 221. The slit 223 may be formed from a rear end portion toward a front end portion of the fixing block 221, may have a predetermined depth, and may have a length ranging from a left side end to a right side end.

A fitting groove 222 into which the connecting member 21 is fitted is formed on a front end portion of the slit 223. The fitting groove 222 may have a length ranging from a left side end to a right side end of the fixing block 221 and may have a diameter which is equal to that of the connecting member 21. The fixing block 221 is coupled to the cover portion of the connecting member 21, by the cover portion 211 being passed through the slit 223 and then being seated in the fitting groove 222.

In addition, in a case where the stabilizer 20 is mounted on the outer circumferential surface of the tub 14, a rear surface of the fixing block 221 on which the slit is formed is in close contact with the outer circumferential surface of the tub 14.

Meanwhile, an seating groove 224 on which the pin supporting member 226 is seated is formed on an upper surface of the fixing block 221 and one or a plurality of pin holes 225 are formed on the seating groove 224. The pin hole 255 passes through an upper surface and a lower surface of the fixing block 221.

Although two pin holes 255 are formed in the presented embodiment, the number of the pinholes 255 is not limited.

In addition, the pin supporting member 226 is coupled to the fixing block 221 and may be made of plastic material having predetermined stiffness. Specifically, the pin supporting member 226 may include a flat and even main plate 227, and a pin sleeve 228 having a predetermined diameter and a predetermined length which extends from a bottom surface of the main plate 227. The number of the pin sleeve 228 may correspond to the number of the pin hole 225.

In addition, the pin sleeve 228 may have a cylindrical shape so that a fastening pin passes through an inside portion of the pin sleeve 228 and a cutting portion 229 which has a length ranging from an upper end to a lower end of the pin sleeve 228 may be formed on a side of the pin sleeve 228. The cutting portion 229 is formed in order to apply an elastic force to the pin sleeve 228. Accordingly, even if the shape of the pin hole 225 is deformed by a deforming force being acted on the fixing block 221, the pin sleeve 228 is prevented from being damaged. In other words, the pin sleeve 228 is capable of being prevented from being damaged while the cut width of the cutting portion 229 is decreased or increased according to the shape deformation of the pin hole 225.

In addition, the seating groove 224 may have a shape which is equal to that of the main plate 227 and may be depressed to have a depth corresponding to a thickness of the main plate 227.

Figure 5:
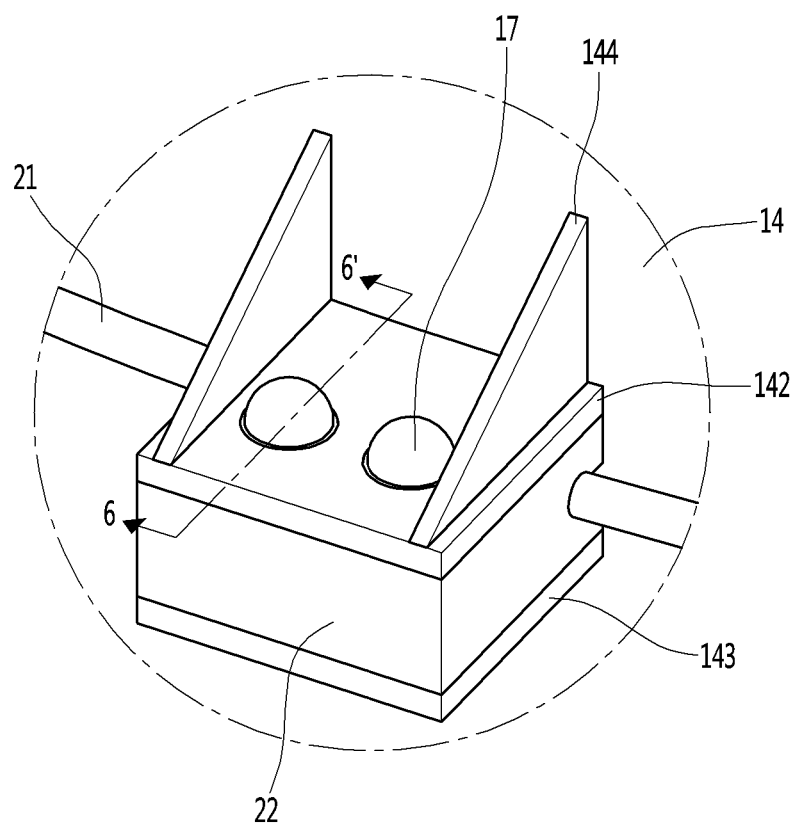
FIG. 5 is an expanded view of portion A of FIG. 1.
Figure 6:
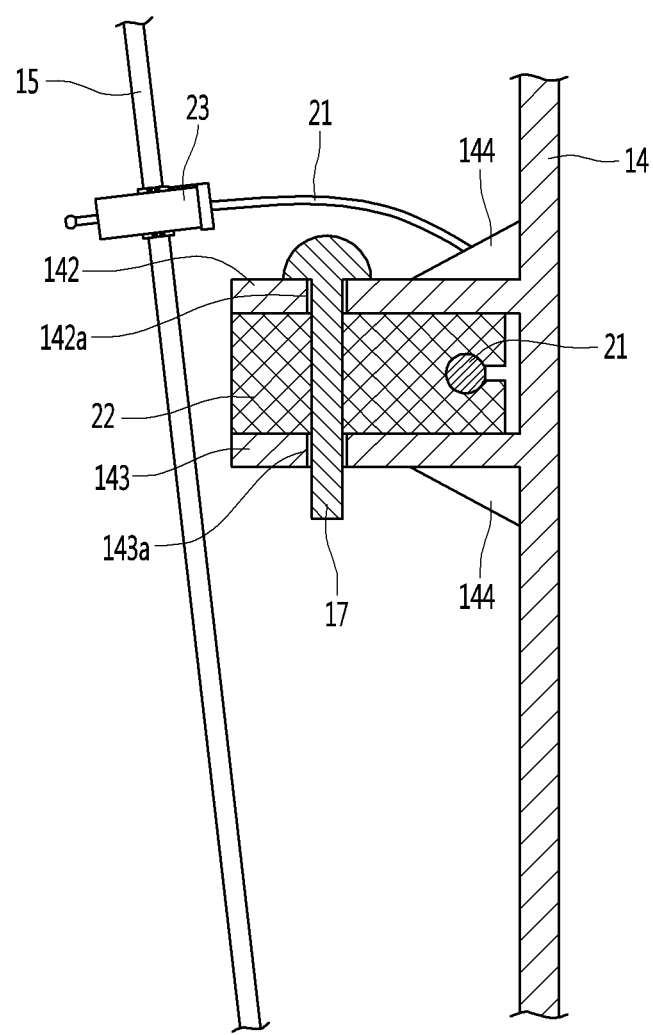
FIG. 6 is a longitudinal sectional view cut along line 6-6' of FIG. 5.

FIG. 5 is an expanded view of portion A of FIG. 1, and FIG. 6 is a longitudinal sectional view cut along line 6-6' of FIG. 5.

With reference to FIG. 5 and FIG. 6, a fastening portion in which the fixing block 221 is inserted and in which fixing block 221 is supported is formed on the outer circumferential surface of the tub 14.

Specifically, in a state where the fixing member 22 is coupled to the connecting member 21, the fixing member 22 is capable of being fixed to the fastening portion of the tub 13 by a pin. An upper portion extension end 142 with which the upper surface of the fixing block 221 is in close contact and a lower portion extension end 143 with which the lower surface of the fixing block 221 is in close contact are formed on the outer circumferential surface of the tub 14. Naturally, a gap between the upper portion extension end 142 and the lower portion extension end 143 has a length corresponding to a thickness of the fixing block 221.

In addition, through holes 142*a* and 143*a* corresponding to the pin hole 225 which is formed on the fixing block 221 are formed on the upper portion extension end 142 and the lower portion extension end 143. A reinforcing rib 144 which connects an upper surface of the upper portion extension end 142 and the outer circumferential surface of the tub 14 to each other and which a lower surface of the lower portion extension end 243 and the outer circumferential surface of the tub 14 to each other may be formed respectively. A phenomenon which the upper portion extension end 142 and the lower portion extension end 143 is separated from the outer circumferential surface of the tub 14 by the upper portion extension end 142 and the lower portion extension end being broken by the vibration in the horizontal direction is capable of being prevented by the reinforcing rib 144.

Meanwhile, fastening pins 17 are inserted into through holes 142*a* and 143*a*. Specifically, the fastening pin 17 passes through the through hole 142*a* of the upper portion extension end 142 and then is inserted into the pin sleeve 228 of the fixing member 22 and the through hole 143*a* of the lower portion extension end 143. Accordingly, the fixing block 221 is connected to the outer circumferential surface of the tub 14 by the fastening pin 17 and as a result, the stabilizer 20 is connected to the outer circumferential surface of the tub 14.

Figure 7:
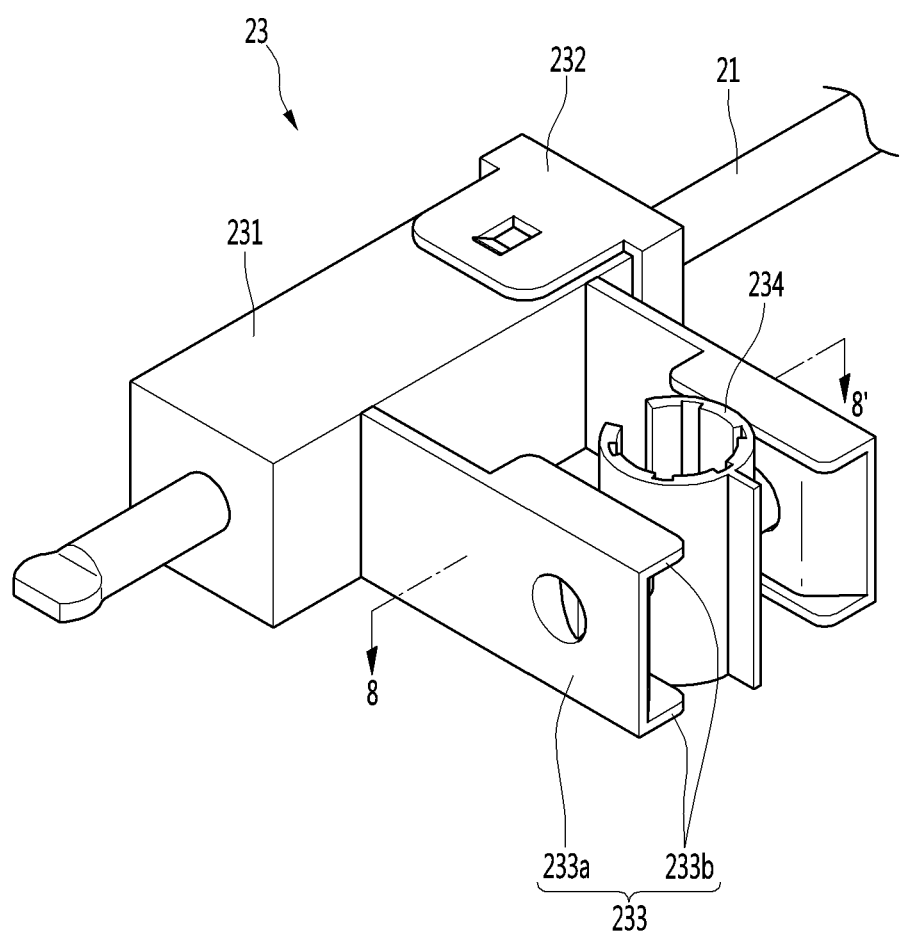
FIG. 7 is an expanded view of portion B of FIG. 2.
Figure 8:
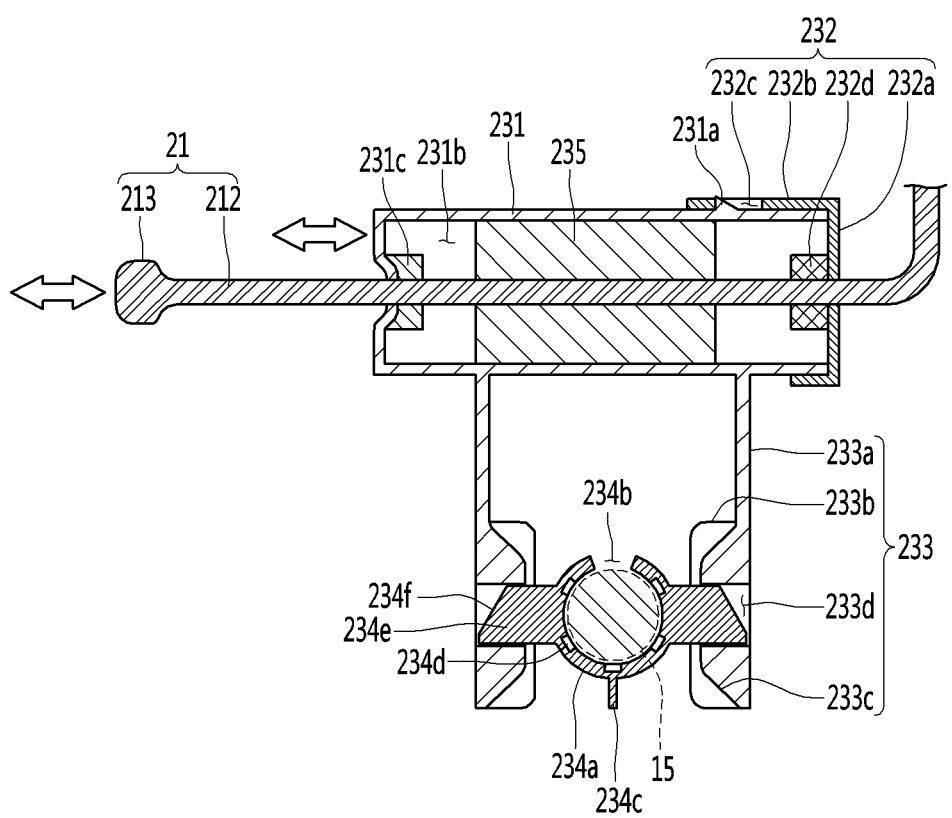
FIG. 8 is a cross-sectional view cut along line 8-8' of FIG. 7.

FIG. 7 is, as an expanded view of portion B of FIG. 2, a perspective view illustrating the damping member which constitutes the stabilizer according to the embodiment of the present invention and FIG. 8 is a cross-sectional view cut along line 8-8' of FIG. 7.

With reference to FIG. 7 and FIG. 8, the stabilizer 20 according to the embodiment of the present invention is connected to the supporting rod 15 by the damping member 23.

Specifically, in a case where the vibration in the horizontal direction is acted on the tub 14, the damping member 23 absorbs and damps the vibration while the damping member 23 is moved along the bent portion 212 of the connecting member 21.

More specifically, the damping member 23 may includes a damping portion which is inserted into the bent portion 212 of the connecting member 21 and a connecting portion which is formed on the side surface of the damping portion and thus connects the damping portion and the supporting rod connecting portion 234 to each other.

The damping portion may include a damper body 231, a damper cover 232 which covers the upper side opening surface of the damper body 231, and a friction ring 235 which is mounted on an inside portion of the damper body 231 and thus wraps the bent portion 212.

The damper body 231 has a rectangular parallelepiped shape or a cylindrical shape which has the damping chamber 231*a* in an inside portion thereof and grease having viscosity may be filled in the damping chamber 231*a*. The grease is prevented from being leaked to the outside by sealing members 231*c* and 243*d* being provided in a bottom portion of the damper body 231 and a bottom surface of the damper cover 232 through which the bent portion 212 pass.

In addition, the friction ring 235 is made of a material such as non-woven fabric. Accordingly in a state where the friction ring 235 is in close contact with an outer circumferential surface of the bent portion 212, the friction ring 235 generates a friction force while moving along the bent portion 212. In other words, in a case where the connecting member 21 moves in the horizontal direction by the vibration in the horizontal direction acting on the tub 14, the vibration in the horizontal direction is damped by a friction force generates on a portion which being in contact between an outer circumferential surface of the bent portion 212 and the friction ring 235 with each other.

In addition, the damper cover 232 may include an upper surface portion 232*a* which covers an upper surface of the damper body 231 and a side surface portion which is overlapped with the outer circumferential surface of the damper body 231 by bending at an edge of the upper surface portion 232a. The side surface portion 232b may have a shape which covers three surfaces except for a surface on which the structure of the connecting portion is formed among four surfaces of the damper body 231.

A through hole through which the bent portion 212 is passed is formed on the upper surface portion 232a. A through hole through which the bent portion 212 is passed is also formed on the bottom portion of the damper body 231. leaking of the grease is prevented by the sealing members 231a and 232a being provided in a bottom portion of the damper body 232 on which the through hole is formed and in a bottom surface of the upper surface portion 232a of the damper cover 232.

A fastening projection 231a projects on an outside surface of the side surface portion of the damper body 231 and a fastening hole 232c into which the fastening projection 231a is inserted and then is hooked may be formed on the side surface portion 232a.

Meanwhile, the connecting portion may include a pair of supporting ribs 233 which extend from any one side surface of the four side surfaces of the damper body 231 and a supporting rod connecting portion 234 which rotatably connected to the pair of supporting ribs 233.

Specifically, each of a pair of supporting ribs 233 may include a main rib 233a which extends from a side surface of the damper body 231, a guide rib 233b which is bent from an upper end and a lower end of the main rib 233a and a fastening hole 233d which passes through the main rib 233a.

Insertion of the supporting rod connecting portion 234 is guided by the insertion guiding surface 233c being formed on an inside surface of the main rib 233a. Specifically, the insertion guiding surface 233c is inclined in a direction in which the thickness of the main rib 233a is gradually increased as it goes from the end portion of the main rib 233a to the edge of the fastening hole 233d.

Meanwhile, the supporting rod connecting portion 234 may include a connecting cylinder 234a into which the supporting rod 15 is inserted, a pair of rotating shaft 234e which extend in the radial direction of the connecting cylinder 234a from the outer circumferential surface of the connecting cylinder 234a and a grasping portion 234c which projects from the outer circumferential surface of the connecting cylinder 234a.

Specifically, the pair of rotating shafts 234e become rotating centers of the connecting cylinder 234a by being formed on positions facing each other about the connecting cylinder 234a and thus being disposed on the same line with each other.

The grasping portion 234c may grasp by a hand of a user by being formed on a line perpendicular to a line passing through the pair of rotating shafts 234e. The slit portion 234b is formed in a longitudinal direction of the connecting cylinder 234a in the portion of the connecting cylinder 234a which corresponds to an opposite side of the grasping portion 234c. In other words, the cross-sectional surface of the connecting cylinder 234a has a c shape. Accordingly, in a case where the supporting rod 15 is inserted into the inside portion of the connecting cylinder 234a, the connecting cylinder 234a is capable of being elastically deformed.

For example, even if an inner diameter of the connecting cylinder 234a is formed to be slightly less than an outer diameter of the supporting rod 15 due to dimensional tolerance, the connecting cylinder 234a is capable of being elastically deformed in a circumferential direction due to the slit portion 234b.

In addition, in a case where the connecting member 21 moves in an arrow direction by the vibration in the horizontal direction acting on the tub 14, the friction force is generated between the damping portion and the connecting member 21. The damping member 23 is capable of also moving along with the connecting member 21 by the friction force. At this time, the connecting cylinder 234a is capable of being elastically deformed by a force in the horizontal direction perpendicular to the supporting rod 15 acting on the connecting cylinder 234a. A phenomenon of a starting portion of the supporting rib 233 being broken is capable of being prevented, by the force in the horizontal direction acting on the supporting rod 15 is eliminated while being deformed in a direction in which the diameter of the connecting cylinder 234a is expanded.

Meanwhile, a plurality of lubrication grooves 234d are formed in a longitudinal direction of the connecting cylinder 234a in an inner circumferential surface of the connecting cylinder 234a and grease may be filled in the lubrication groove 234d.

In addition, an inclined surface 234f is capable of being in contact with the insertion guiding surface 233c of the supporting rib 233 by the inclined surface 234f being formed in an end portion of the rotating shaft 234e. Specifically, in order to mounting the supporting rod connecting portion 234 on the supporting rib 233, the user grasps the grasping portion 234c of the connecting cylinder 234a and allows the inclined surface 234f of the rotating shaft 234e to be engaged to the insertion guiding surface 233c. in this state, in a case where the connecting cylinder 234a is pushed into an inner side of the supporting rib 233, the inclined surface 234f of the rotating shaft 234e slides along the insertion guiding surface 233c. The rotating shaft 234e is inserted into the fastening hole 233d formed on the end portion of the insertion guiding surface 233c.

Here, in a case where the inclined surface 234f of the rotating shaft 234e slides along the insertion guiding surface 233c, the pair of supporting ribs 233 slightly spread apart from each other. The rotating shaft 234e is completely inserted into the inside portion of the fastening hole 233d and thus is not separated from the fastening hole 233d by the rotating shaft 234e being returned to an original position at the moment to be inserted into the fastening hole 233d.

Figure 9:
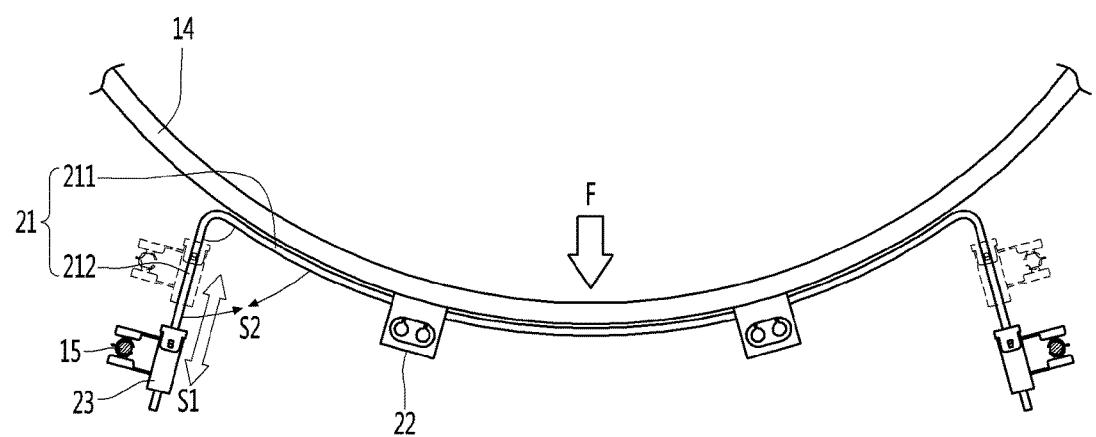
FIG. 9 is a view illustrating an operation of the stabilizer according to the embodiment of the present invention.

FIG. 9 is a view illustrating an operation of the stabilizer according to the embodiment of the present invention.

With reference to FIG. 9, in a case where the vibration F in the horizontal direction acts on the tub 14, the tub 14 is eccentrically moved in the arrow direction.

The stabilizer 20 is moved in a state of being a body with the tub 14 by the vibration in the horizontal direction and in a state where the damping member 23 is fixed to the supporting rod 15, the friction force is generated while the bent portion 212 of the connecting member 21 passes through the damping member 23 and moves in an arrow S1 direction. The vibration F in the horizontal direction is damped by the friction force which is generated. As a result, the tub 14 is prevented from hitting the cabinet 11 while a moving displacement of the tub 14 in the horizontal direction is reduced.

In addition, an end portion of the bent portion 212 escapes from the supporting rod 15 and then moves in a direction which is close to the cabinet 11 by the vibration in the horizontal direction. In other words, the bent portion 212 is capable of escaping from the supporting rod 14 and horizontally moving in a direction which is close to the cabinet 11 while the damping member is not moved only by a distance corresponding to the gap between the supporting rod 15 and the tub 14.

Meanwhile, in a case where the magnitude of the vibration F in the horizontal direction is small, the vibration F is capable of being damped by only any one of the friction force which is generated at the damping member 23 or an elastic restoring force of the connecting member 21, and in a case where the magnitude of the vibration F in the horizontal direction is large, the vibration is capable of being primarily damped by the friction force of the damping member 23 and the vibration is capable of being secondarily damped by an elastic restoring force of the connecting member 21.

Specifically, in a case where the vibration F is generated, the connecting member 21 is capable of being elastically deformed in a decreasing direction S2 or in an increasing direction of a bent angle 8 between the connecting portion 211 and the bent portion 212 is gradually decreased or increased. The restoring force is accumulated while the connecting member 21 is elastically deformed and the restoring force and the vibration F in the horizontal direction are offset each other and thus the vibration F is capable of being damped.

In summary of the characteristics of the stabilizer 20 according to the embodiment of the present invention, the vibration F is capable of being damped only by any one of the friction force which is generated from the damping member 23 and the elastic force of the connecting member 21 or the vibration F is capable of being damped by acting in combination of the friction force of the damping member 23 and the elastic force of the connecting member 21, according to the vibration F in the horizontal direction acting on the tub 14.

What is claimed is:

1. A stabilizer, comprising:
   one or plurality of fixing members which are mounted on a cylindrical outer circumferential surface of a tub which is upright so that an opening portion for inputting laundry faces an upper surface of a laundry processing device;
   connecting member which is connected to the one or plurality of fixing members and is elastically deformed by force acting in a horizontal direction when the tub is vibrated in the horizontal direction in the upright state; and
   a damping member which is connected to the connecting member to absorb or offset die force acting in the horizontal direction when the tub is vibrated in the horizontal direction in the uptight state,
   wherein the connecting member includes:
      a cover portion which is connected to the one or plurality of fixing members by being rounded along the outer circumferential surface of the tub in upright state; and
      a bent portion which is bent at both ends of the cover portion and then extends,
      wherein the damping member includes:
         a damping pardon through which the bent portion passes; and
         a connecting portion which is coupled to the damping portion,
         wherein the connecting portion is connected to a supporting rod which connects the tub and a cabinet with each other, the cabinet configured to accommodate the tub, and
   wherein, when the force in the horizontal direction which acts when the tub in upright state is vibrated in the horizontal direction is transferred to the connecting member, the bent portion relatively moves in the horizontal direction with respect to the damping portion, such that a friction force which offsets the force in the horizontal force between the bent portion and the damping portion is generated.

2. The stabilizer according to claim 1, wherein the connecting member has a rod shape.

3. The stabilizer according to claim 1, wherein each of the one or plurality of fixing members includes:
   a fixed block having a surface into which any one portion of the connecting member is fitted; and
   a pin supporting member which is inserted into the fixed block.

4. The stabilizer according to claim 3, wherein the fixed block is made of rubber or silicon material, and
   wherein the pin supporting member is made of plastic material.

5. The stabilizer according to claim 3, wherein the pin supporting member includes;
   a main plate which is seated on an upper surface of the fixed block; and
   one or plurality of pin sleeves which extend from the main plate,
   wherein a pin for connecting the fixing block and the tub with each other is inserted into the one or plurality of pin sleeves.

6. The stabilizer according to claim 1, wherein the damping portion includes:
   a damper body;
   a friction ring which is accommodated in an inside portion of the damper body; and
   a damper cover which covers an opened surface of the damper body,
   wherein the bent portion passes through the damper cover and the damper body, and
   wherein a friction force is generated between the friction ring and the outer circumferential surface of the bent portion by the force in the horizontal direction.

7. The stabilizer according to claim 6, wherein the connecting portion includes;
   a pair of supporting ribs which extends from the outer circumferential surface of the damper body and has a fastening hole formed therein; and
   a supporting rod connecting portion which is rotatably connected to the pair of supporting ribs and into which a supporting rod is inserted.

8. The stabilizer according to claim 7, wherein the supporting rod connecting portion includes:
   a connecting cylinder into which the supporting rod is inserted; and
   a pair of rotating shafts which extend from an outer circumferential surface of the connecting cylinder,
   wherein the pair of rotating shafts are inserted, into the fastening holes which are formed on the pair of supporting ribs, respectively.

9. The stabilizer according to claim 1, wherein the connecting member is elastically deformed in an increasing direction or decreasing direction of an angle between the connecting portion and the bent portion, by the vibration in the horizontal direction acting on the tub.

10. A laundry processing device, comprising:
    the cabinet which forms an outer appearance of the laundry processing device;

the tub which is accommodated in an inside portion of the cabinet, in which an opening portion for inputting laundry faces an upper surface of the cabinet, and which has an outer circumferential surface on which one or more fastening portions are formed;

the plurality of support rods which connect the tub and the cabinet with each other; and the stabilizer according to claim 1 which connects the plurality of fastening portions and the plurality of support rods, respectively, and damps a vibration in the horizontal direction acting on the rub.

11. The laundry processing device according to claim 10, wherein each of the fastening portions includes;

an upper extension end which extends from the outer circumferential surface of the tub; and a lower extension end which extends from the outer circumferential surface of the tub corresponding to a lower side, of the upper extension end, and wherein the one or plurality of fixing members is inserted between the upper extension end and the, lower extension end.

12. The laundry processing device according to claim 11, further comprising one or more fastening pins which sequentially pass through the upper extension end, the one or plurality of fixing members, and the lower extension end.

13. The laundry processing device according to claim 10, wherein the stabilizer is disposed at one position of the outer circumferential surface of the tub which corresponds to a front surface, a rear surface, a left side surface, and a tight side surface of the cabinet.

14. The laundry processing device according to claim 10, wherein the stabilizer is provided in plurality, in such a manner that the stabilizers are disposed to face each other at positions of the outer circumferential surface of the tub which correspond to a front surface and a rear surface, or a left side surface and a right side surface of the cabinet.

15. The laundry processing device according to claim 10, wherein the stabilizer is provided in plurality at positions of the outer circumferential surface of the tub which correspond to a front surface, a rear surface, a left side surface, and a right side surface of the cabinet.

* * * * *